United States Patent [19]
Charbonnier et al.

[11] Patent Number: 5,124,701
[45] Date of Patent: Jun. 23, 1992

[54] QUANTIZATION DEVICE WITH VARIABLE DIGITAL CODING RATE

[75] Inventors: Alain Charbonnier, Versailles; Jean P. Petit, Minihy-Treguier, both of France

[73] Assignee: France Telecom, Paris, France

[21] Appl. No.: 652,636

[22] Filed: Feb. 8, 1991

[30] Foreign Application Priority Data

Feb. 16, 1990 [FR] France .................. 90 01913

[51] Int. Cl.$^5$ .................. H03M 7/40; H03M 7/42
[52] U.S. Cl. .................. 341/61; 341/200; 341/106
[58] Field of Search .................. 341/61, 200, 106; 375/31, 32, 94, 122

[56] References Cited

U.S. PATENT DOCUMENTS

| | | | |
|---|---|---|---|
| 4,044,306 | 8/1977 | Villeret et al. | 341/61 |
| 4,109,110 | 8/1978 | Gingell | 341/64 X |
| 4,464,783 | 7/1984 | Beraud et al. | 341/51 X |
| 4,954,824 | 9/1990 | Yamada et al. | 341/61 |

OTHER PUBLICATIONS

H. Kuroda et al., "1.5Mb/s Interframe Codec for Video Teleconferencing", Review of the Electrical Communication Laboratories, vol. 33, No. 4, 1985, pp. 631-638.
T. Tanguchi et al., "ADPCM with a Multiquantizer for Speech Coding" IEEE Journal on Selected Areas in Communications, vol. 6, No. 2, Feb. 1988, pp. 410-424.

Primary Examiner—Sharon D. Logan
Attorney, Agent, or Firm—Oliff & Berridge

[57] ABSTRACT

A quantization device with variable digital coding rate for coding and decoding sound and speech in telecommunications and frequency transform coding. For a signal of amplitude $|x|$ whose probability density is of the Laplace law type $p(x)=a/2e^{-|x|}$, this device comprises a quantizer operator and a reverse quantizer operator. The quantizer operator includes an operator for calculating the ampltiude signal and a sign signal, an operator for combining the amplitude signal $|x|$ and the number N of digital codes by subtracting a term $KN=3/\alpha \text{ Log }(N+1)$ and a quantizer with fixed quantization thresholds in which the value of the thresholds $Li$ is determined by the relation $Li=-3/\alpha \text{ Log }(i+1)$. The reverse quantizer operator includes a reverse quantizer with fixed reverse quantization levels $\Gamma i$ with $\Gamma i=3/\alpha \text{ Log }(2i+2)$, an operator for combining a normed decoded amplitude signal and the number N of digital codes by addition of said term KN for delivering a decoded ampltiude signal $|y|$ and an operator for combining the decoded amplitude signal $|y|$ and the sign signal IS for delivering a reconstituted digital signal corresponding to the digital signal x.

10 Claims, 3 Drawing Sheets

QUANTIZATION DEVICE WITH VARIABLE DIGITAL CODING RATE

The invention relates to a device for the quantization, and a device for the reverse quantization, of a digital signal with variable digital coding rate.

The procedures for the digital coding of analog signals comprise essentially an operation for sampling these analog signals followed by an operation for quantization of the samples. With the sampling operation carried out in accordance with the general rules in sampling techniques, by periodically taking samples, the quantization operation consists in causing a digital code value to correspond to each sample, by comparing the value of this sample with a certain number of threshold values, by means of a quantization operator.

With the above coding procedure is associated a procedure for decoding the digital signal for restoring the original analog signals. The decoding procedure uses a reverse quantization operator which restores a sample value from each digital code value; the set of digital code values or digital codes forms the digital code signal. The original analog signals may be obtained by filtering said samples. In the rest of the description, the assembly formed by a quantizer operator and a reverse quantizer operator will be designated by quantization device.

In relation to said quantization devices, the number of code values or digital codes possible is an essential characteristic. In fact, the digital codes or code values forming the latter are usually expressed in bit form. The number of bits used for representing each sample, multiplied by the sampling frequency, forms the bit rate for digital coding of these samples.

The quantization operation may however be applied to samples already digitized, which reduces the number of digital code values used for coding a sample. In the following description, samples already digitized will be considered to which the above mentioned quantization and reverse quantization procedures will be applied.

In prior art quantization devices, a quantization operator is characterized by the number of digital codes possible, referenced N, and by the value of $N-1$ quantization thresholds, referenced xi, where i designates the order of the quantization thresholds. By convention, i varies from 1 for the maximum value of xi to $N-1$, minimum value of xi, with the relation $$xN-1 < xN-2 < \ldots < x2 < x1$$

For a given sample x, the coded quantized signal I at the output of the quantizer operator is formed in the following way:

| | |
|---|---|
| if $x < xN-1$ | $I = N-1$ |
| if $xi + 1 < x < xi$ | $I = i$ |
| if $x1 < x$ | $I = 0$ |

The reverse quantizer operator makes it possible to decode the coded quantized signal I by associating a quantization level, referenced yi, with each code value or code forming the coded quantized signal. Since the number of quantization levels for I may take the preceding values from 0 to $N-1$, it is then equal to N.

The signal delivered at the output of the reverse quantizer operator, referenced y, is given by the relation $y = yi$ for the coded quantized signal I previously defined, an output signal value yi being associated with a code according to the invention I in one to one mapping (bijection), for a significant amplitude range of the original signal.

For the above defined quantization devices, the difference signal $y - x$ between the input of the quantizer operator and the output of the reverse quantizer operator is called quantization noise. The power of the quantization noise is a measurement of the distortion introduced by the quantization device. Generally, calculation of a quantizer operator and a reverse quantizer operator consists in determining the values of the threshold xi or level yi quantization parameters, so as to minimize the quantization noise, taking into account the probability density of signal x. For a more complete study of the values of the parameters xi and yi for different values of N, digital code number and quantization level number, reference may be made to the article published by Joel Max, entitled "Quantizing for minimum distortion", published in the Review IRE trans. Inform. Theory, vol II-6, pp 7-12, March 1960.

In the case of a non uniform probability density function, an exact expression of the parameters xi and yi cannot a priori be obtained; to each value of the number N of coded values there corresponds a given set of parameters.

Recently, algorithms for variable rate coding of speech and sound have been studied. Since sound and speech have a non uniform probability density $p(x)$, closely related to a Laplace function, the construction of coding systems on the basis of said algorithms requires the use of several non uniform quantizer operators, namely several sets of parameters xi and yi so as to make possible, on the one hand, coding of the signal at several rates, and, on the other hand, separate quantization with different characteristics.

By way of example, the coding algorithm will be mentioned defined by the recommendation G722 of the CCITT of July 1986, which makes it possible to code, at bit rates of 48, 56 or 64 kbits/sec. sound signal samples in a frequency band of 40 Hz to 7 kHz.

For using said coding algorithm, four different reverse quantizer operators are necessary for implementing decoding, the number of quantizer operators being reduced for implementing the coding because in particular of the introduction of imbricated code techniques.

The prior art quantization devices are therefore formed by fixed quantization devices, to the extent that an operator and a reverse quantizer operator only provide sample coding and decoding at a single coding rate fixed by the sets of parameters xi and yi, use of the variable rate quantization device requiring, at least at the decoding level, a plurality of different fixed reverse quantizer operators.

OBJECTS AND SUMMARY OF THE INVENTION

An object of the present invention is on the contrary to overcome the limitations of the prior art quantization devices by providing a variable rate quantization device which only uses a single quantizer and a single reverse quantizer for the coding respectively decoding of a digital signal at several bit rates, such as digital signals representative of speech.

A further object of the present invention is to provide a quantization device in which a single quantization procedure and a single set of quantization threshold value parameters xi is used for coding respectively decoding a signal at several bit rates.

Another object of the present invention is also to provide a quantization device in which the number of codes N of the equivalent quantization device is adjustable between the value 1 and a maximum value Nmax.

Another object of the present invention is also to provide a variable rate quantization device which may be optimized for a probability density varying according to a law of the Laplace law type, particularly adapted to the coding respectively decoding of signals representative of speech and sound, so that the parameters of the quantization device according to the invention have performances substantially identical to those obtained by means of the prior art devices using a set of optimized fixed quantizer and reverse quantizer operators.

Another object of the present invention is also to provide a variable rate quantization device able to be used in the new sound coding techniques, such as frequency transform coding, in which the quantization and the reverse quantization of a large number of signal components at different bit rates, varying in time, must be carried out.

The quantization device with variable digital coding rate as a function of the number N of digital codes or quantization levels of a digital signal with amplitude distribution according to a probability density law p(x) of the Laplace law type, $p(x) = \alpha/2 \, e^{-\alpha|x|}$ where $|x|$ represents the amplitude of the signal over a symmetrical operation interval $[-xm, +xm]$, according to the invention, is remarkable in that it comprises a quantizer operator with an operator for calculating an amplitude signal and a sign signal from the digital signal and an operator for combining the amplitude signal and the number N of digital codes by subtraction of a term $$KN = -\frac{3}{\alpha} \text{Log} (N + 1)$$

delivering a normed coded amplitude signal as a function of the number N of digital codes. A quantizer with fixed quantization thresholds in which the value of the thresholds Li is determined by the relation $$Li = -\frac{3}{\alpha} \text{Log} (2i + 1)$$

where i designates the order of the quantization thresholds, which receives the normed coded amplitude signal and delivers a coded quantized amplitude signal at a coding bit rate depending on the number N of digital codes or quantization levels.

The quantization device with variable digital coding rate, as a function of the number N of digital codes or quantization levels of a coded quantized amplitude signal (IM), from a digital signal (x) with amplitude distribution according to a Laplace's law $p(x) = \alpha/2 \, e^{-\alpha|x|}$ where x represents the amplitude of the digital signal over an amplitude interval $[-xm, +xm]$, the coded quantized amplitude signal (Im) comprising N digital codes, according to the invention is remarkable in that it comprises a reverse quantizer operator including a reverse quantizer with fixed reverse quantization levels i, whose value is given by the relation $$\Gamma i = \frac{3}{\alpha} \text{Log} (2i + 2)$$

where i designates the order of the reverse quantization levels. The fixed level reverse quantizer receives the coded quantized amplitude signal (IM) and delivers a normed decoded amplitude signal as a function of the number N of digital codes or quantization levels. An operator for combining the normed decoded amplitude signal and the number N of digital codes or quantization levels by addition of a term $$KN = \frac{3}{\alpha} \text{Log} (N + 1)$$

is provided and delivers a decoded amplitude signal $|y|$ independent of the number N of digital codes or quantization levels. An operator for combining the decoded amplitude signal $|y|$ and a sign signal (Is) provides a reconstituted digital signal y corresponding to the digital signal x.

The variable rate quantization device according to the invention finds an application in the coding and decoding of digitized signals such as speech and sound for transmission thereof in particular.

BRIEF DESCRIPTION OF THE DRAWINGS

The variable rate quantization device according to the invention will be better understood from the following description and accompanying drawings in which :

FIG. 1b is a block diagram of a variable rate quantization device according to the invention incorporating a corresponding reverse quantizer operator, for decoding the signals coded by means of the quantizer operator shown in FIG. 1a;

FIG. 3 is a block diagram of a variable rate quantization device according to the invention incorporating a reverse quantizer operator 3b adapted more particularly for decoding signals which are coded with an imbricated code coming from a quantizer operator such as shown in FIG. 3a.

DETAILED DESCRIPTION OF PREFERRED EMBODIMENTS

The variable digital coding rate quantization device according to the invention will be first of all described with reference to FIGS. 1a and 1b.

Generally, an input signal will be considered in the form of a digital signal, referenced x, which will be subjected to a coding then decoding procedure at a variable digital coding rate according to the invention.

The above digital signal x corresponds to a signal with amplitude distribution in accordance with a probability density law referenced p(x) of Laplace's law type, this probability density law being of the form $p(x) = \alpha/2 \, e^{-|\alpha|}$ In said law, the coefficient $\alpha$ is a constant of given value and $|x|$ represents the amplitude of the signal over a symmetrical operating interval between [−x max and x max].

It will be noted in particular that the digital signal x corresponds to a signal sampled at a suitable sampling frequency taking into account the frequency spectrum of said signal x. These samples are of course digitized in the form of digital samples with corresponding amplitude and sign.

Figure 1A:
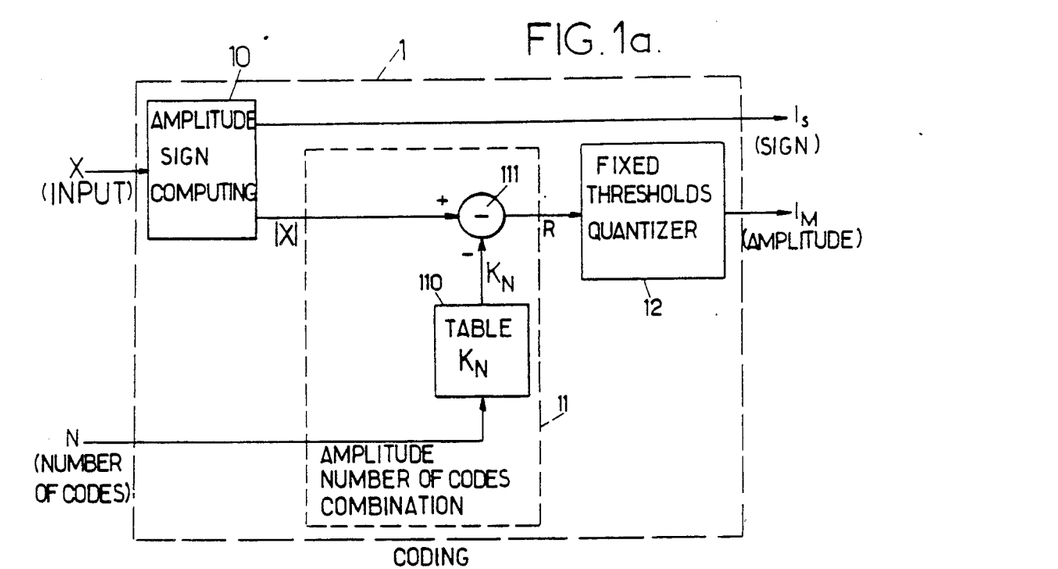
FIG. 1a is a block diagram of a variable rate quantization device according to the invention incorporating a corresponding quantizer operator.

As has been shown in FIG. 1a, the variable digital coding rate quantization device according to the invention comprises a quantizer operator, referenced 1, for providing the variable rate digital coding.

This quantizer operator comprises more particularly, as shown in FIG. 1a, a calculating operator delivering a digital amplitude signal, referenced $|x|$ and a sign signal, referenced IS, the amplitude $|x|$ and sign signals thus representing respectively the amplitude value and the sign value of said digital signal x. It will of course be understood that the calculating operator 10 may be formed by a conventional type digital operator capable of extracting a sign bit for forming the sign signal IS of said digital samples plus a word representative of the amplitude of this same digital signal.

As is further shown in FIG. 1a, the quantizer operator 1 also comprises an operator 11 for combining the amplitude signal $|x|$ and the number N of digital codes, this number N corresponding, as mentioned above, to the number of digital code values by means of which the amplitude signal $|x|$ will be represented on a given significant range, as will be described subsequently. The combination operator 11 in fact subtracts, from the amplitude signal $|x|$, a term KN whose value is given by the relation $$KN = \frac{3}{\alpha} \text{Log} (N + 1)$$

The combination operator 11 then delivers a normed coded amplitude signal, referenced R in FIG. 1a, as a function of said number N of digital codes. It will in particular be noted that the combination operator 11 may, for this purpose, comprise a conversion table 110 which, from the value N of the number of codes, provides the term KN verifying the above relation The combination operator 11 further comprises, as shown in FIG. 1a, a subtracter operator, referenced 111, which, on a positive input port receives the value of the amplitude signal $|x|$ and, on a subtraction port, referenced −, the value of said term KN. The output port of the subtracter operator 111 delivers the normed coded amplitude signal R.

As is further shown in FIG. 1a, the variable digital coding rate quantization device according to the invention also comprises a quantizer 12 with fixed quantization threshold, which receives the normed coded amplitude signal R delivered by the above combination operator 11. The fixed quantization threshold quantizer 12 has, in accordance with a particularly advantageous aspect of the present invention quantization levels whose value Li is determined by the relation $$Li = -\frac{3}{\alpha} \text{Log} (2i + 1)$$

In said relation, i designates the order of quantization thresholds of the fixed threshold quantizer 12. The fixed quantization threshold quantizer 12 delivers a coded quantized amplitude signal, referenced IM in FIG. 1a, whose coding rate depends on the number n of digital codes or quantization levels.

It will thus be understood that during operation of the quantizer operator such as shown in FIG. 1a, quantization of the amplitude signal $|x|$ may be effected whatever the number of codes N used for coding said amplitude signal by means of the fixed quantization threshold quantizer 12 using the normed coded amplitude signal R as a function of the number N of digital codes, the amplitude signal $|x|$ being as it were adapted as a function of the number N of codes and, so, of the corresponding coding rate, for quantization by the fixed quantization threshold quantizer 12, such as shown in FIG. 1a.

According to an advantageous characteristic of the quantizer operator, such as shown in FIG. 1a, the number of quantization thresholds of the fixed quantization threshold quantizer 12 is equal to Nmax/2 − 1, for an even maximum number of codes Nmax, the number N of codes for coding the amplitude signal $|x|$ being able to take on values between 1 and Nmax. Of course, it will be understood that for reasons of coding simplification, the number of codes may itself correspond to an even number. An uneven number of codes however not being excluded.

According to another advantageous characteristic of the quantization device according to the invention, for a given value N of the number of codes, as mentioned above, the quantization threshold values of the quantization device and, so, of the quantization operator 1 such as shown in FIG. 1a verify the relation ;

$$xi = \frac{3}{\alpha} (\text{Log} (N + 1) - \text{Log} (2i + 1))$$

The above relation giving the quantization threshold values of the quantizer operator 1 is verified
- for $1 \leq i \leq N/2$ if N is even
- or for $1 \leq i \leq (N-1)/2$ if N is uneven.

Figure 1B:
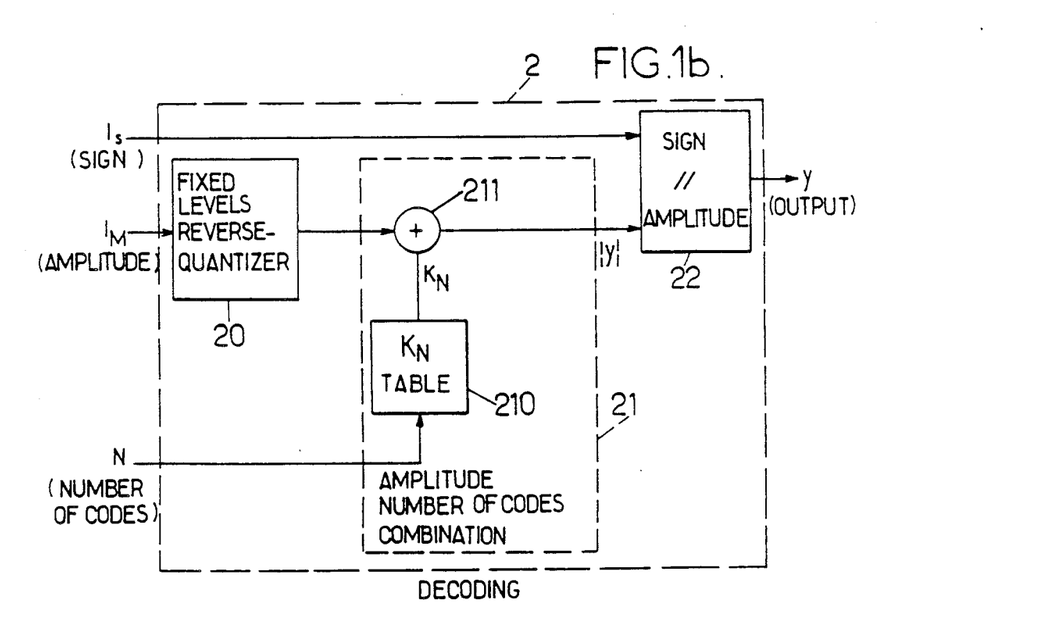

Of course, in order to form a variable digital coding rate quantization device according to the invention, with a quantizer operator such as shown in FIG. 1 there is associated a reverse quantization operator, such as shown in FIG. 1b, these two elements forming the quantization device according to the invention being able, in the most general case, to be delocalized and separated by very large distances, several hundreds of kilometers, by means of a digital data transmission line for example. They may on the contrary be associated in the same apparatus so as to form, for example, a telephone set.

As is shown in FIG. 1b, the variable digital coding rate quantization device according to the invention, in order to decode a coded quantized amplitude signal reference IM, such as delivered by the quantizer operator 1 shown in FIG. 1a from a digital signal x satisfying the above conditions, this coded quantized amplitude signal IM comprising N digital codes, comprises a reverse quantizer operator, referenced 2, providing decoding at a variable digital decoding rate.

As is shown in FIG. 1b, the reverse quantizer operator 2 comprises a reverse quantizer 20 with fixed reverse quantization levels ⌈i. The reverse quantizer 20 with fixed reverse quantization level ⌈i receives, on an input port, the coded quantized amplitude signal IM.

According to an advantageous characteristic of the quantization device according to the invention, the reverse quantization levels ⌈i verify the relation $$\Gamma i = \frac{3}{\alpha} \text{Log} (2i + 2)$$

In said relation, i designates the order of the reverse quantization levels of the reverse quantizer 20. The latter delivers a normed decoded amplitude signal, referenced IMDN, as a function of the number N of digital codes or quantization levels.

Generally, it will be understood that the fixed quantization level reverse quantizer 20, for each code or code value of the coded quantized signal IM, makes it possible to cause a corresponding digitized sample value i for a given reverse quantization level $\Gamma i$ in a reverse operation to correspond to the quantization operation previously carried out by the fixed quantization threshold quantizer 12 of the quantizer operator 1 shown in FIG. 1a.

Thus, as further shown in FIG. 1b, the reverse quantizer operator 2 also comprises an operator 21 for combining the normed decoded amplitude signal IMDN and the number N of digital codes or quantization levels by addition of a term $$KN = \frac{3}{\alpha} \text{Log} (N + 1)$$

The combination operator 21 delivers a decoded amplitude signal $|y|$ independent of the number N of digital codes or quantization levels. For this, combination operator 21 may comprise, as shown in FIG. 1b, a conversion table 210 which, from a signal representing the number N of codes received at an input port, delivers said term KN, the conversion table 210 being, similarly to the conversion table 110 of the combination operator 11 of the quantizer operator 1 of FIG. 1a, formed for example by a memory circuit which causes the pre-calculated values of the term KN to correspond to said input values N.

Furthermore, as is shown in this same FIG. 1b, the reverse quantizer operator 2 finally comprises an operator 22 for combining the decoded amplitude signal $|y|$ and the sign signal IS transmitted from the quantizer operator 1 over the transmission line to the reverse quantizer operator 2. The operator 22 for combining the decoded amplitude signal and the sign signal IS allows a reconstituted digital signal y to be delivered corresponding to the original digital signal x. It will be readily understood that the operator 22 for combining the decoded amplitude signal y and the sign signal IS may be formed by a digital circuit providing concatenation of the bits of the word representative of the decoded amplitude signal $|y|$ and of the sign signal IS for generating a signed word representative of the reconstituted digital signal y.

According to a characteristic of the reverse quantizer operator 2 such as shown in FIG. 1b, the number of fixed level reverse quantization levels of the reverse quantizer 20 is equal to Nmax/2 for a maximum even number of digital codes Nmax.

According to an advantageous characteristic of the quantization device according to the invention, the reverse quantization levels of the reverse quantizer operator 2 verify the relation $$yi = \frac{3}{\alpha} (\text{Log} (N + 1) - \text{Log} (2i + 2))$$

where i designates the order of the reverse quantization levels
 - for $1 \leq i \leq N/2 - 1$ if N is even
 - or for $1 \leq i \leq (N-1)/2$ if N is uneven.

Of course, it will be understood that to a quantization threshold level Li of the fixed quantizer 12 of the quantizer operator 1 there corresponds a reverse quantization level $\Gamma i$ of the fixed reverse quantizer 20 and that to a quantization threshold level xi of the quantizer operator 1 there corresponds a reverse quantization level yi of the reverse quantizer operator 2 as a function of the number N of codes or of quantization levels.

It will also be noted that, for said given value N of the number of codes or quantization levels, this number N being between the value 1 and the value Nmax mentioned above, $1 < N < \text{Nmax}$, the coded quantized amplitude signal referenced IM verifies the relation
 - for N even, $D_N \leq IM \leq D_N + N/2 - 1$
 - and for N uneven, $D_N \leq IM \leq D_N + (N-1)/2$ In the preceding relations, the term DN represents a minimum value of IM, which forms a code value or a particular code for a set of given values of the signal x.

Justification of the values of the parameters of the quantizer operator 1 and of the reverse quantizer operator 2 forming the variable digital coding rate quantization device according to the invention will now be given with reference to FIG. 2.

Figure 2:
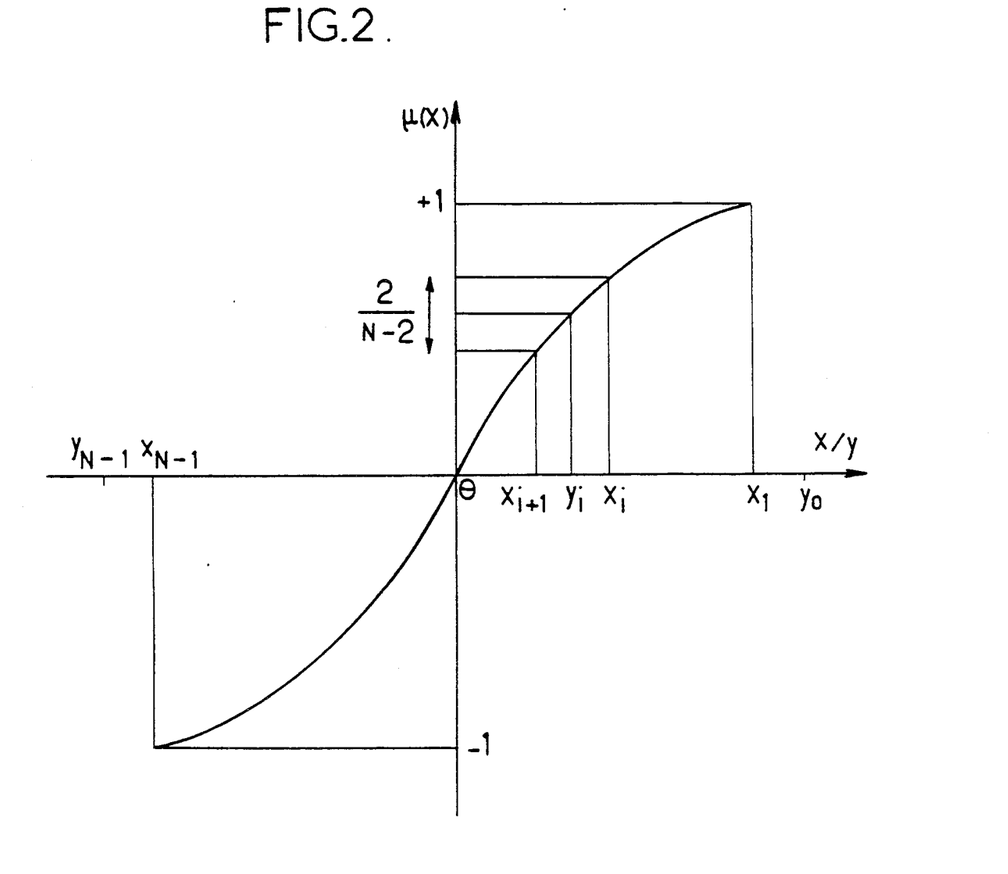
FIG. 2 shows the characteristic function $\mu(xi; yi)$ of a fixed threshold quantization device equivalent to the variable rate quantization device according to the invention.

In FIG. 2, the characteristic function of a quantizer in the general sense has been shown.

The quantizer is said to be optimized when the characteristic function thereof makes it possible to minimize the quantization noise, a different reverse quantization level reference yi corresponding generally to a quantization threshold referenced xi, this difference being the generator of quantization noise.

The probability density of the signal $|x|$ at the input of the quantizer being referenced p(x), the number N of the quantization threshold xi and reverse quantization level yi values having been defined above, the quantization interval number i is between the quantization threshold values $x_{i+1}$ and $x_i$ and the characteristic function of the quantizer is referenced $\mu(x)$.

The quantizer is assumed symmetrical with respect to the origin 0.

The N-quantization intervals of order i, i varying form 0 to N−1, are defined by $[-\infty x_{n-1}], [x_{n-1} x_{n-2}], \ldots [x2\ x1], [x1 + \infty]$.

The characteristic function causes N−1 points referenced $\mu(xi)$ distributed evenly over the axis (x) to correspond to the N−1 quantization thresholds between x1 and $x_{n-1}$. By definition, for a fixed threshold quantizer $\mu(x_{n-1}) = -1$ and $\mu(x1) = +1$ because of the symmetry.

The characteristic function comprises three parts $$[\alpha s_{n-1}[, [x_{n-1}\ x1], [x1 + \alpha]$$

To the segment [xN−1 x1] of the quantization thresholds there corresponds, on the characteristic function, the segment [−1 + 1] comprising N−2 quantization intervals for which we have the relations:

$$\mu(x_i) - \mu(x_{i+1}) = \frac{2}{N-2} \quad (1)$$

$$\mu(x_i) = 1 - 2\frac{i-1}{N-2} \quad (2)$$

For a large number of quantization intervals, the probability density p(x) on each quantization interval is assumed constant and the optimum reverse quantization level yi, for the quantization interval i, verifies the relation:

$$y_i = (x_{i-1} x_i)/2 \quad (3)$$

The characteristic function being linearized on each quantization interval, we may then write:

$$\mu(y_i) = \mu(x_i) - 1/(N-2) \quad (4)$$

For the quantization segment $x_{n-1}$ x1, the power of the quantization noise verifies the relation $$Q[x_{n-1} \ x_1] = \sum_{i=1}^{N-2} p(y_i) \, q_i^3/12 \quad (5)$$

with: $q_i = x_i - x_{i+1}$ \quad (6)

Considering the quantization segments $[-\alpha x n - 1]$ and $[x1 + \alpha]$, the total quantization noise is given by the relation (7), the contribution to the total quantization noise of the quantization segments $[x1 + \infty]$ and $[-\infty x_{n-1}]$ being assumed identical:

$$Q = \sum_{i=1}^{N-2} p(y_i) q_i^3/12 + 2 \int_{x_1}^{+\infty} (u - y_0)^2 p(u) du \quad (7)$$

Calculation of the parameters of the quantizer, i.e. of the quantization threshold levels $x_i$ and of the reverse quantization levels $y_i$, consists in making the above defined power of the quantization noise Q minimum.

For $$\theta_i = (y_i)^{\frac{1}{2}} q_i \quad (8)$$

the power of the quantization noise is written:

$$Q(\theta_i, x_1, y_0) = \frac{1}{12} \left( \sum_{i=1}^{N-2} \theta_i^3 \right) + 2 \int_{x_1}^{+\infty} (u - y_0)^2 p(u) du \quad (9)$$

The parameters $\theta_i$ and $x_i$, taking into account the considerations of symmetry of the characteristic function, are related by the constraint relation $$\sum_{i=1}^{N-2} \theta_i = 2C_1 = 2 \int_0^{x_1} p(u)^{\frac{1}{2}} du \quad (10)$$

with $$C_1 = \int_0^{x_1} p(u)^{\frac{1}{2}} du \quad (11)$$

Taking into account the above relations (11)) and (10), the constraint relation is written:

$$F(\theta_i, x_i) = \left( \sum_{i=1}^{N-2} \theta_i \right) + \int_{x_1}^{+\infty} p(u)^{\frac{1}{2}} du - 2C = 0 \quad (12)$$

with $$C = \int_0^{+\infty} p(u)^{\frac{1}{2}} du \quad (13)$$

Since the problem consists in minimizing the quantization noise power, Q is then reduced to a problem of optimization with constraint. A resolution in accordance with Lagrange's theorem for a solution $Q(\theta_i, x_1, y_0)$ is obtained for cancellation of the differential of:

$$J = Q(\theta_i, x_1, y_0) - \beta F(\theta_i, x_1))$$

Cancellation of the partial drift of J with respect to $\theta_i$ then with respect to $y_1$ and $x_0$ makes it possible to obtain successively $$\beta = \frac{C_1^2}{(N-2)^2} \quad (14)$$

$$\theta_i = \frac{2C_1}{(N-2)} \quad (15)$$

$$q_i = \frac{2}{N-2} \cdot \frac{C_1}{p(y_i)^{\frac{1}{2}}} \quad (16)$$

$$y_0 - x_1 = \frac{1}{N-2} \cdot \frac{C_1}{p(x_1)^{\frac{1}{2}}} \quad (17)$$

$$y_0 = \frac{\int_{x_1}^{+\infty} u p(u) du}{\int_{x_1}^{+\infty} p(u) du} \quad (18)$$

With the characteristic function $\mu(x)$ linearized over the quantization interval $[x_{i+1} \ x_i]$, the expression of the drift of the characteristic function with respect to x may be obtained from the relation (16) and the characteristic function $\mu(x)$ obtained by integration verifies the relation:

$$\mu(x) = \frac{\int_0^x p(u)^{\frac{1}{2}} du}{C_1} \quad (19)$$

The values of the quantization thresholds $x_i$ and the quantization levels $y_i$ may then be calculated from the above relation (19) and the preceding relations (2) and (4) and verify the relations respectively:

$$\frac{\int_0^{x_i} p(u)^{\frac{1}{2}} du}{C_1} = \frac{(N-2) - 2(i-1)}{(N-2)} \quad 1 \leq i \leq N-1 \quad (20)$$

$$\frac{\int_0^{y_i} p(u)^{\frac{1}{2}} du}{C_1} = \frac{(N-2) - 2(i-1)}{(N-2)} \quad 1 \leq i \leq N-2 \quad (21)$$

For a probability density p(x) of the given digital input signal, the relations (11) (17) and (18) make it possible to determine the boundary $x_1$ of the quantization thresholds and the boundary $y_0$ of the quantization level.

The above relations (20) and (21) then allow the other quantization thresholds and levels to be calculated.

For a probability density p(x) given by a Laplace's function as was described above, a remarkable value in so far as the speech or sound signals are concerned for the parameter $\alpha$ is $\alpha = \sqrt{2}$.

Replacement by the expression of this probability density in the relation (11) gives the value of $C_1$ hereafter:

$$C_1 = \left(\frac{\alpha}{2}\right)^{\frac{1}{2}} \frac{3}{\alpha}(1 - e)^{\alpha/3x1} \quad (22)$$

Similarly, the value of the probability density p(x) in the relation (18) allows the value of the boundary $y_0$ of the quantization levels to be obtained:

$$y_0 = x_1 + \frac{1}{\alpha} \quad (23)$$

Calculation of the boundary xl of the values of the quantization levels may then be obtained from relations (17) (22) and (23), the value of $x_1$ being given by the relation $$x_1 = \frac{3}{\alpha} \text{Log}\left(1 + \frac{N-2}{3}\right) \quad (24)$$

Calculation of the characteristic function $\mu(x)$ for $x_i > 0$ may then be made from the expression of the above probability density and from the preceding relations (19) and (22). The characteristic function $\mu(x)$ is written:

$$(x) = \frac{N+1}{N-2}(1 - e^{\alpha/3x}) \quad (25)$$

The quantization levels and the value of the latter $x_i$ for $x_i > 0$ may be established from the above relations (2) and (25), the value of the quantization thresholds verifying the relation:

$$x_i = \frac{3}{\alpha}(\text{Log}(N+1) - \text{Log}(2i+1)) \quad (26)$$

for $1 \leq i \leq N/2$ if N is even
$1 \leq i \leq (N-1)/2$ if N is uneven

Similarly, the reverse quantization levels $y_i$ for $y_i > 0$ may be calculated from the preceding relations (2) (4) and (25), the reverse quantization levels verifying the relation:

$$y_i = \frac{3}{\alpha}(\text{Log}(N+1) - \text{Log}(2i+2)) \quad (27)$$

for $0 \leq i \leq N/2 - 1$ if N is even
$0 \leq i \leq (N-1)/2$ if N is uneven

It will be noted in particular that the expression of said reverse quantization levels $y_i$ makes it possible to calculate, for i=0, a good approximation of the previously calculated value $y_0$.

A more detailed description of a quantization device with variable digital coding rate in accordance with the present invention and more particularly intended for use with imbricated codes will now be given with reference to FIGS. 3a and 3b.

In these figures, the same references represent the same elements as in the case of FIGS. 1a and 1b.

The imbricated code technique will be recalled which involves, for decoding, a series of reverse quantizers derived from the quantizer of the coder or quantizer operator by truncation of the transmitted code I. Thus, if $N_{min}$ is the minimum number of codes and levels, the numbers of levels of the reverse quantizers are of the form $N_{min} \cdot 2^k$.

It will be simply recalled that in the case where the minimum number $N_{min}$ of codes and levels is uneven, the passage from the $2N_{min}$ code quantizer to the $N_{min}$ code quantizer by truncation of code I is made correct by numbering the quantization intervals which begins by I=0 for the highest amplitude of the signal to be quantized.

In the case of quantization of a non uniform signal, i.e. a digital signal such as signal x for which the amplitude probability density obeys a law of the Laplace law type, the characteristic function $\mu(x)$ calculated previously allows a method to be applied similar to that followed for a uniform quantizer by operating on the values of $\mu(x)$ or on the values of i according to the relation (2).

Thus, the characteristic function of an optimum quantizer is established having an optimized quantization noise $Q_{OPT}$ comprising $N_{OPT}$ codes.

Different uniform quantizers can thus be derived along the $\mu$ axis, or along the i axis, representative of the order of the quantization thresholds by dividing the quantization intervals of the characteristic function $[\mu(x_{i+1}) \mu(x_i)]$ by $2 \times N_{OPT}$ or $4 \times N_{OPT}$ code numbers for example or by grouping these intervals together by 2, 4 or more code numbers less than the optimum number of codes $N_{OPT}$. The thresholds and levels of the quantizers along the $|x|$ axis, i.e. the parameters $x_i$ and $y_i$, are determined as a reverse image of the uniform quantizers by the characteristic function $\mu(x)$. It will however be noted that only the quantizer $Q_{OPT}$ is optimum.

Figure 3A:
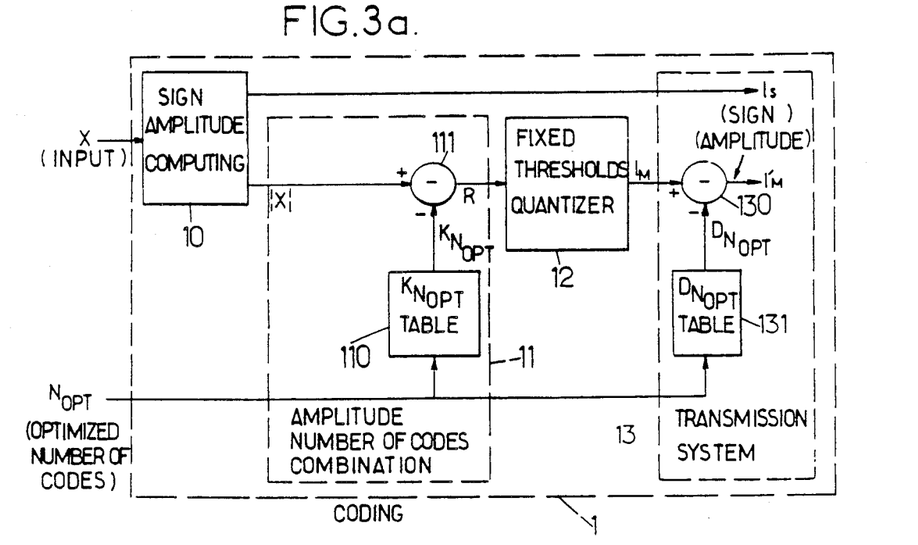
Figure 3B:
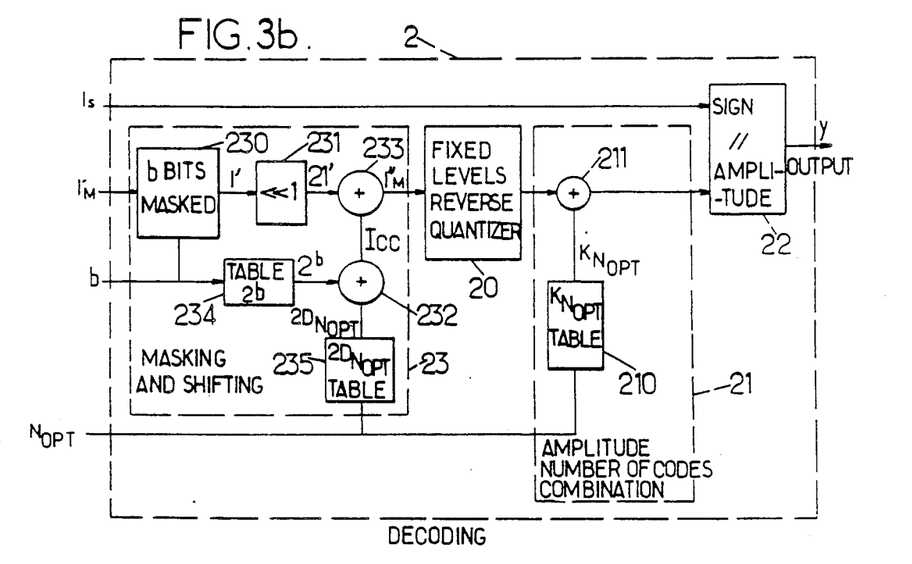

In the variable digital coding rate quantization device according to the invention, in the case where such a device is used for coding and decoding using the imbricated code technique, as shown in FIGS. 3a and 3b and contrary to the prior art devices which use a reverse quantizer specific to fixed reverse quantization levels for each value b of the number of masked low order bits, the device of the invention uses a quantizer operator allowing coding with a maximum number of codes according to the bit rate constraints whereas the reverse quantizer operator, in accordance with the present invention uses only a single reverse quantizer at a fixed quantization level and yet makes it possible to control the number of codes referenced $N_{OPT}$ of the configuration for $b = b_{OPT}$ corresponding to the number of masked bits corresponding to the optimum transmission performances.

As is shown in FIG. 3a, in the case where a coded quantized amplitude signal referenced I'M is generated using an imbricated code over an optimum number of codes $N_{OPT}$, the quantizer operator 1 further comprises an operator module referenced 13 for modifying the low order bits of the coded quantized amplitude signal I'M during transmission of the code. The operator module 13 is then connected in cascade with the quantizer operator previously described in connection with the quantizer operator 1 or may be simply associated there-with. According to an advantageous characteristic of the quantization device according to the invention such as shown in FIG. 3a, calculation of the quantity I'M, in which the b low order bits may be modified during transmission, is made by the operator module 13 by subtracting, from the coded quantized signal IM delivered by the fixed threshold quantizer 12, a quantity referenced $DN_{OPT}$ corresponding to the number of codes $N_{OPT}$. The quantity noted $DN_{OPT}$ will preferably be chosen equal to the minimum value of code IM for the number of codes $N_{OPT}$.

It will thus be understood that on coding the quantizer operator 1 has as input the digital signal x and the number of codes at the optimum $N_{OPT}$ and as output the sign signal IS and the coded quantized amplitude signal I'M corresponding to the coded quantized amplitude signal IM from which the quantity $D_{NOPT}$ has been subtracted. Subtraction of said quantity thus indicates that the modification of the low order bits by the transmission system must be made on the quantity I'M.

It will be understood that in connection with the operation of the quantizer operator such as shown in FIG. 1a in the general case, in the absence of imbricated codes, for a given value of code number $N_{OPT}$ between 1 and $N_{OPT}$max, the coded quantized amplitude signal IM verifies the relation:

if $2^{bOPT}N$ even,
$$D_{NOPT} \leq I_M \leq D_{NOPT} + 2^{bOPT}N_{OPT}/2 - 1 \text{ if}$$
$2^{bOPT}N$ uneven,
$$D_{NOPT} \leq I_M \leq D_{NOPT} + (2^{bOPT}N_{OPT} - 1)/2 \quad (28)$$

As will be noted from FIG. 3a, the operator module 13 may advantageously comprise a subtracter operator, referenced 130, receiving at a positive input port the coded quantized amplitude signal IM delivered by the fixed quantization threshold quantizer 12 and at a negative subtraction input the quantity $D_{NOPT}$ itself delivered via a conversion table 131 receiving, at the input, the value $N_{OPT}$ of the number of codes at the optimum. The subtracter operator 130 delivers the coded quantized signal $I'_M$ adapted to the imbricated code.

As is further shown in FIG. 3b, the quantization device, for receiving a coded quantized amplitude signal $I'_M$ using an imbricated code over an optimum number of digital codes $N_{OPT}$ comprising a number b of modified low order bits comprises, besides the reverse quantizer operator 2, upstream of the reverse quantizer 20 with fixed reverse quantization levels, a module 23 for masking the b modified bits and for shifting the bits of the coded quantized amplitude signal $I'_M$ in accordance with the imbricated code. With the masking model 23 a restored coded quantized amplitude signal can be generated, referenced $I''_M$, applied to the input of the reverse quantizer 29 with fixed reverse quantization level.

Thus, the reverse quantizer operator 2 such as shown in FIG. 3b has as input the sign signal IS, the coded quantized amplitude signal $I'_M$, the number of low order bits having become non significant b and the optimum number of codes of the quantizer $N_{OPT}$. On the other hand it delivers the restored signal y corresponding to the digital input signal x of the quantizer operator shown in FIG. 3a.

As shown in FIG. 3b, a module 23 for masking and shifting the bits comprises an element 230 for writing bits of given value on the b low order bits of the coded quantized amplitude signal $I'_M$ according to an imbricated code so as to generate a masked coded quantized signal I'. By way of non limitative example, the bits of given value may have the value 0 and the writing element being for example formed by a read and write addressable memory.

Furthermore, the bit masking and shifting module 23 comprises an element for shifting by 1 bit at the level of the masked coded quantized signal I' for generating a double masked coded quantized signal, referenced 2I' The bit shifting element 231 may be formed for example by a register of shift register type.

Furthermore, a first adder element 232 is provided for summing a first value $2^b$ where b represents the number of bits effectively masked because of the imbricated coding, this value $2^b$ being for example delivered by a conversion table 234 which receives the value b of the number of bits effectively masked and a second value $2D_{NOPT}$ corresponding to the number of codes $N_{OPT}$ and permitting modification of the low order bits during transmission. The first adder element 232 makes it possible to generate a coded correction signal referenced ICC of value $2^b + 2D_{NOPT}$.

The masking module 23 finally comprises a second adder element 233 for summing the double masked coded quantized signal referenced 2I' and the coded correction signal delivered by the first adder element 232. The second adder element 233 makes it possible to generate the coded quantized amplitude signal $I''_M$ applied to the input of the reverse quantizer 20.

The operation of the corresponding parts of the quantizer operator 2 shown in FIG. 3b downstream of the masking and bit shift operator is then identical to operation of the reverse quantizer operator 2 shown in FIG. 1b, the restored coded quantized amplitude signal $I''_M$ previously described being substituted for the coded quantized amplitude signal $I_M$.

Thus, the configuration of the quantization device in the case of imbricated coded signals depends on the value of two inputs, the number of codes $N_{OPT}$ and the number of masked bits b. The performances of the quantization device are optimum when the number of masked bits b is equal to the optimum number of masked bits $b = b_{OPT}$ and in this case the number of codes of the quantization device is of course equal to $N = N_{OPT}$. In the general case, the number of codes of the quantization device is $N = 2^{(bOPT-b)} \times N_{OPT}$. In the case where no bit is masked by the transmission line, i.e. for $b = 0$, the number of codes is thus $N = 2^{bOPT}N_{OPT}$.

It will of course be understood that the parameters of the quantization threshold $x_i$ and reverse quantization level $y_i$ values of the quantization device for an imbricated code signal in accordance with the present invention, such as shown in FIGS. 3a and 3b, may be calculated as described hereafter, similarly to the preceding calculation relative to the quantization device such as shown in FIGS. 1a and 1b in the absence of imbricated codes. The maximum number of codes for $b = 0$ number of bits masked by the transmission system is equal to $N = 2^{bOPT} \times N_{OPT}$, this maximum number of codes corresponding to the number of codes of a quantizatiom device at the level of a quantizer operator. This quantizer operator is obtained by dividing each interval $i + 1i$ of a quantizer operator referenced $Q_{OPT}$ into $2^{bOPT}$ quantization intervals.

The relation (26) giving the value of the quantization thresholds $x_i$ is then written:

$$x_i = \frac{3}{\alpha} \left( \text{Log}(N_{OPT} + 1) - \text{Log} \left( 2 \frac{i}{2^{bOPT}} + 1 \right) \right) \quad (29)$$

The above quantization threshold values $x_i$ for the optimum quantizer operator are then written:

$$x_i = \frac{3}{\alpha} (\text{Log}(2^{bOPT}N_{OPT} + 2^{bOPT}) - \text{Log}(2i + 2^{bOPT})) \quad (30)$$

for $1 \leq i \leq 2^{bOPT-1}N_{OPT}$

Replacement of the b low order bits of code i by bits of given value such as values 0 for a value b between 0 and bmax, $0 \leq b \leq b_{max}$, makes it possible in fact to obtain $b_{max+1}$ quantizers referenced $Q_b$ each having $2^{bOPT-b}xN_{OPT}$ codes, the latter number having necessarily to correspond to a whole value.

If J is the code obtained from code i after truncation of b bits, the quantization thresholds xj of coder j of each corresponding quantizer operator $Q_b$ are derived from relation (30) by replacing i by the value $2^b.j$ and verify the relation:

$$x_{2bj} = \frac{3}{\alpha} - (\text{Log}(2^{bOPT}N_{OPT} + 2^{bOPT}) - \text{Log}(2^{b+1}j + 2^{bOPT})) \quad (31)$$

for $1 \leq j \leq 2^{bOPT-b-1}N_{OPT}$

Of course, this series of quantizer operators $Q_b$ comprises the optimum quantizer operator $Q_{OPT}$ for $b=b_{OPT}$. It will of course be noted that the performances of quantizer operators $Q_b$ worsen the more b is departed from the value $b_{OPT}$.

For a quantizer operator $Q_b$ previously defined by these quantization threshold levels the value of the quantization levels $y_i$ of the reverse quantizer operator may be obtained, with again $i=2^b.j$ by writing for example that the characteristic function for the quantization level $y_i$, namely $\mu(y_i)$ is the middle of the quantization interval $[\mu(x_{i+1})\mu(x_i)]$, i.e. by replacing j by $j+\frac{1}{2}$ in the above relation (31).

The reverse quantization levels $y_i$ of the reverse quantizer $Q_b$ then verify the relation;

$$y_i = \frac{3}{\alpha} - (\text{Log}(2^{bOPT}N_{OPT} + 2^{bOPT}) - \text{Log}(2i + 2_b + 2^{bOPT})) \quad (32)$$

with $i = 2^bj$, $0 \leq j \leq 2^{bOPT-b-1}N_{OPT} - 1$

The parameters of the variable rate quantization device with imbricated code in accordance with the present invention are then totally defined by the following values:

$$K_{NOPT} = 3/\alpha \text{Log}(2^{bOPT}N_{OPT} + 2^{bOPT})$$

$$D_{NOPT} = 0$$

$$L_i = 3/\alpha \text{Log}(2i + 2^{bOPT}) \text{ for}$$
$$1 < i < 2^{bOPT-1}N_{OPTmax} - 1 \quad (33)$$

$$\Gamma_i - 3/\text{Log}(i + 2^{bOPT}) \text{ for } 1 \leq i \leq 2^{bOPT}N_{OPTmax}$$

$N_{OPTmax}$ is the maximum value of $N_{OPT}$.

The following table allows the performances of the variable digital coding rate quantization device according to the invention to be compared with the performances of a set of fixed optimized quantizers corresponding to an even number of codes or quantization levels varying from 2 to 128, these optimized fixed quantizers being defined in accordance with the method described in the article by Joel Max previously mentioned in the description.

In said table, in column 1 appear the number of quantization levels or codes and in columns 2 and 3 respectively the signal to noise ratio in dB for the corresponding optimum quantizer and for the variable rate quantizer according to the invention.

| Number of Levels | Signal to noise ratio (dB) | |
|---|---|---|
| | Optimum | Variable rate |
| 2 | 3.02 | 2.82 |
| 4 | 7.55 | 7.34 |
| 8 | 12.64 | 12.50 |
| 16 | 18.14 | 18.05 |
| 32 | 23.88 | 23.83 |
| 64 | 29.75 | 29.72 |
| 128 | 35.69 | 35.68 |

The above table shows that the variable rate quantization device according to the invention allows performances to be obtained very close to the theoretical optimum, all the more so the higher the number of quantization levels or codes.

We claim:

1. Quantization device with variable digital coding rate as a function of a number N of digital codes or quantization levels, of a digital signal with amplitude distribution according to a probability density law p(x) of the Laplace law type, $$p(x) = \alpha/2 \, e^{-|x|},$$

where $\alpha$ represents a constant of a given value, and $|x|$ represents an amplitude of said digital signal over a symmetrical operation interval, wherein said device comprises:

a quantizer operator comprising:
a) a first operator for calculating said amplitude $|x|$ and a sign signal from said digital signal;
b) a second operator for combining said amplitude signal $|x|$ and the number n of digital codes by subtraction of a term KN whose value is $$KN = \frac{3}{\alpha} \text{Log}(N + 1)$$

from said amplitude $|x|$, said second operator delivering a normed coded amplitude signal as a function of the number N of digital codes; and
c) a fixed threshold quantizer with threshold values Li verifying the following relation:

$$Li = \frac{-3}{\alpha} \text{Log}(2i + 1)$$

where i designates an order of the threshold values, said fixed threshold quantizer receiving said normed coded amplitude signal and delivering a coded quantized amplitude signal IM whose coding bit rate is a function of said number N of digital codes or quantization levels.

2. Device according to claim 1, wherein the fixed threshold quantizer further has a number of quantization thresholds equal to Nmax/2−1 for a maximum even number of codes Nmax.

3. Device according to claim 1, wherein, for a given value N of the number of digital codes, the quantization threshold values of this device verify the relation:

$$xi = \frac{3}{\alpha} (\text{Log}(N + 1) - \text{Log}(2i + 1))$$

for $1 \leq i \leq N/2$     if $N$ is even for $1 \leq i \leq (N - 1)/2$     if $N$ is uneven.

4. Device according to claim 1, wherein, for a given value of the number N of digital codes or quantization levels, with $1 < N < N_{max}$, said coded quantized amplitude signal IM verifies the relation:
for N even $D_N \leq IM \leq D_N + N/2 - 1$
for N uneven $D_N \leq IM \leq D_N + (N-1)/2$
where $D_N$ represents a minimum value of said coded quantized amplitude signal IM.

5. Quantization device according to claim 1, wherein said quantizer operator further comprises:
   d) an operator module for modifying said coded quantized amplitude signal to support an imbricated code over an optimum number of codes NOPT by subtracting quantity DNOT corresponding to said optimum number of codes NOPT from said coded quantized signal and in which low order bits may be modified during transmission.

6. Quantization device with variable digital coding rate, as a function of a number N of digital codes or quantization levels of a coded quantized amplitude signal, from a digital signal with amplitude distribution according to a probability density law p(x) of the Laplace law type, $$p(x) = \alpha/2 \, e^{-|x|}$$

where $\alpha$ represents a constant of a given value, and $|x|$ represents the amplitude of said digital signal over a symmetrical amplitude interval, said coded quantized amplitude signal comprising N digital codes, wherein said device includes:
   a) a reverse quantizer with fixed reverse quantization levels $\Gamma i$, whose value is given by the relation $$\Gamma i = -\frac{3}{\alpha} \text{Log}(2i + 2)$$

where i designates an order of said fixed reverse quantization levels, said reverse quantizer receiving said coded quantized amplitude signal and delivering a normed decoded amplitude signal as a function of the number n of digital codes or quantization levels;
   b) a first operator for combining said normed decoded amplitude signal and said number n of digital codes or quantization levels by addition to said normed decoded amplitude signal of a term $$KN = -\frac{3}{\alpha} \text{Log}(N + 1);$$

said first operator delivering a decoded amplitude signal $|y|$ independent of said number N of digital codes or quantization levels; and
   c) a second operator for combining said decoded amplitude signal $|y|$ and a sign signal for delivering a reconstituted digital signal y corresponding to said digital signal.

7. Device according to claim 6, wherein said reverse quantizer further has a number of said fixed reverse quantization levels equal to Nmax/2 for a maximum even number of digital codes Nmax.

8. Device according to claim 6, wherein said fixed reverse quantization levels of said reverse quantizer verify the relation:

$$yi = \frac{3}{\alpha} (\text{Log}(N + 1) - \text{Log}(2i + 2))$$

for $1 < i < N/2 - 1$     if $N$ is even $1 < i < (N - 1)/2$     if $N$ is uneven.

9. Device according to claim 6, wherein, for receiving a coded quantized amplitude signal supporting an imbricated code over an optimum number of digital codes, $N_{OPT}$, comprising a number b of modified low order bits, said reverse quantized operator further comprises, upstream of said reverse quantizer with fixed reverse quantization levels, a module for masking said modified low order bits and for shifting said modified low order bits of the coded quantized amplitude signal supporting said imbricated code for generating a restored coded quantized amplitude signal applied to an input of said reverse quantizer with fixed reverse quantization levels.

10. Reverse Quantization device according to claim 9, wherein said module for masking and shifting comprises:
   an element for writing bits of given value on the modified low order bits of said coded quantized amplitude signal supporting said imbricated code so as to generate a masked coded quantized signal;
   an element for shifting by a bit to the left said masked coded quantized signal for generating a double masked coded quantized signal;
   first adder element adding a first value $2^b$, where b represents the number of bits effectively masked, and a second value $2DN_{OPT}$ corresponding to an optimum number $b_{OPT}$ of low order bits ensuring optimum transmission, for generating a coded correction signal of value $2^b + 2DB_{OPT}$; and
   a second element for adding said double masked coded quantized signal and said coded correction signal delivered by said first adder element for generating said restored coded quantized amplitude signal applied to the input of said reverse quantizer.

* * * * *